Patented Aug. 26, 1924.

1,506,203

UNITED STATES PATENT OFFICE.

HENRY L. PRESTHOLDT, OF MINNEAPOLIS, MINNESOTA.

CASEIN GLUE.

No Drawing.  Application filed April 17, 1922. Serial No. 554,196.

*To all whom it may concern:*

Be it known that I, HENRY L. PRESTHOLDT, a citizen of the United States, residing at Minneapolis, in the county of Hennepin and State of Minnesota, have invented certain new and useful Improvements in Casein Glues; and I do hereby declare the following to be a full, clear, and exact description of the invention, such as will enable others skilled in the art to which it appertains to make and use the same.

My invention provides a new composition of matter, herein designated as "casein glue", but which, from its broader aspect, is an adhesive composition adapted to be used by itself or commingled with other substances, as an adhesive coating.

In this improved adhesive composition, casein is used as the adhesive base and it is commingled with dextrine, calcium oxide, sodium fluoride, sodium chloride, oil and resin. The sodium fluoride acts as a solvent of the casein, while the sodium chloride contributes, in a measure, to the keeping of the glue sweet and clean.

I have obtained a very highly efficient glue or adhesive material by the use of the above noted substances in accordance with the following formula:

|  | Parts. |
|---|---|
| Casein | 50 to 75 |
| Dextrine | 2 to 8 |
| Calcium oxide | 10 to 20 |
| Sodium fluoride | 2 to 10 |
| Sodium chloride | 1 to 5 |
| Oil | 1 to 4 |
| Resin | 1 |

The above noted substances, except the oil, are commingled in dry powdered form and the oil is in such small quantity that it does not make the powdered mass pasty but keeps the same from getting into dust form. This adhesive composition is sold in dry powdered form, and when it is to be used, it will be introduced into water to form an emulsion, and it is then, of course, that the chemical reactions that develop the adhesive compositions, will take place. After the chemical reactions have taken place, the emulsion is adapted to be used as glue or as a coating to be commingled with other substances, such as paint or calcimine, which contain color pigments. When desired, however, the color-producing pigments may be commingled with the dry composition. When the composition is to be used simply as a glue, no additions to the above formula given, except water, will be required.

A peculiarity of this formula is that it contains the following solvents: calcium oxide, sodium fluoride, sodium chloride, and an oil, which, together, act as a solvent for the two colloidal properties, casein and dextrine. Calcium oxide has the peculiarity of uniting with the casein, forming an insoluble compound known as "calcium caseinate", and in combination with the sodium chloride, prolongs the liquid life of the solution. Sodium fluoride is a casein solvent but, in the absence of the other ingredients, could not effect a solution of the above colloids. The oil has the peculiar property of preventing the calcium oxide from changing into a calcium carbonate.

What I claim is:

1. An adhesive composition made substantially in accordance with the following formula, to wit:

|  | Parts. |
|---|---|
| Casein | 50 to 75 |
| Dextrine | 2 to 8 |
| Calcium oxide | 10 to 20 |
| Sodium fluoride | 2 to 10 |
| Sodium chloride | 1 to 5 |
| Oil | 1 to 4 |

2. An adhesive composition made in accordance with the following formula:

|  | Parts. |
|---|---|
| Casein | 50 to 75 |
| Dextrine | 2 to 8 |
| Calcium oxide | 10 to 20 |
| Sodium fluoride | 2 to 10 |
| Sodium chloride | 1 to 5 |
| Oil | 1 to 4 |
| Resin | 1 |

In testimony whereof I affix my signature.

HENRY L. PRESTHOLDT.